UNITED STATES PATENT OFFICE.

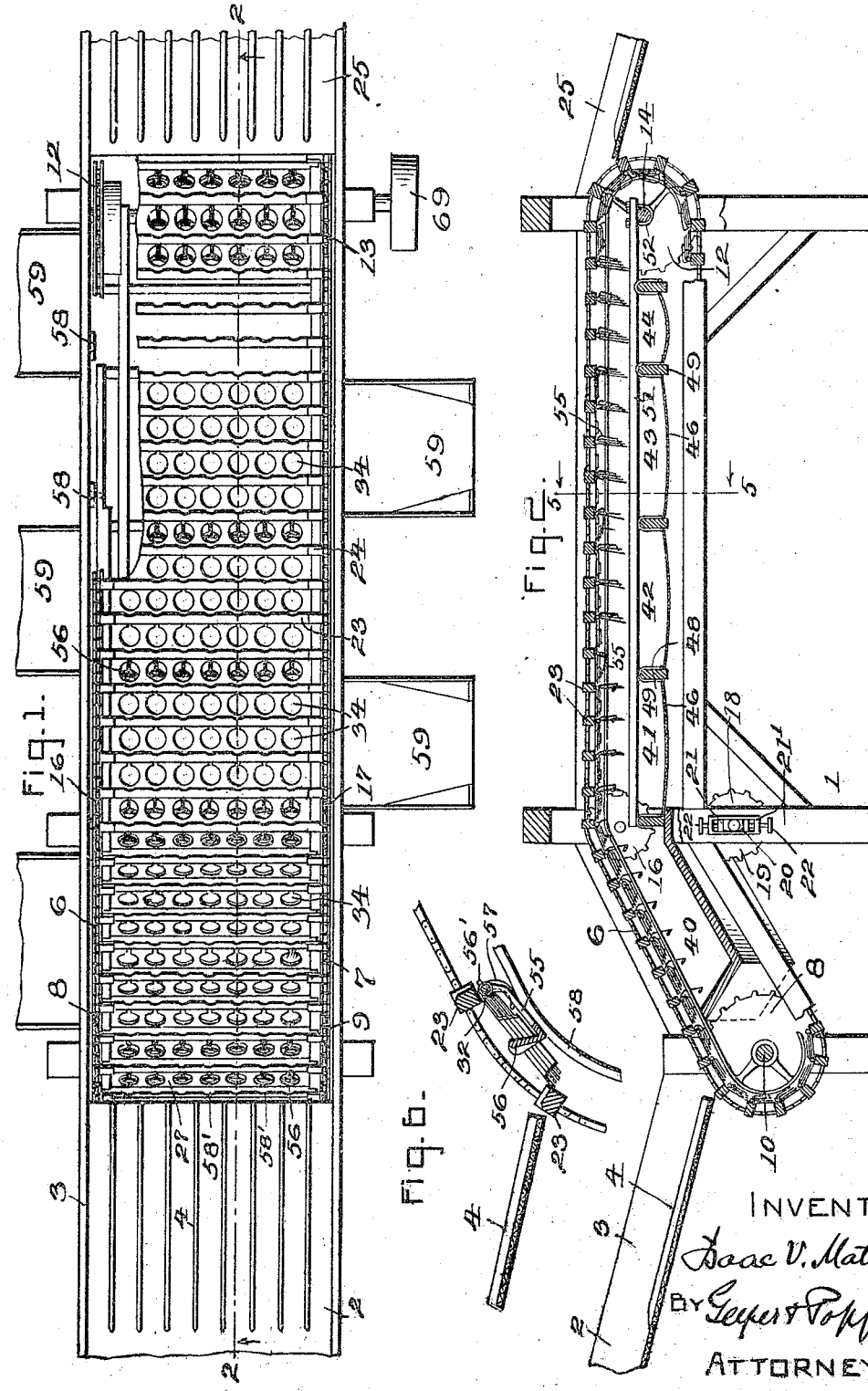

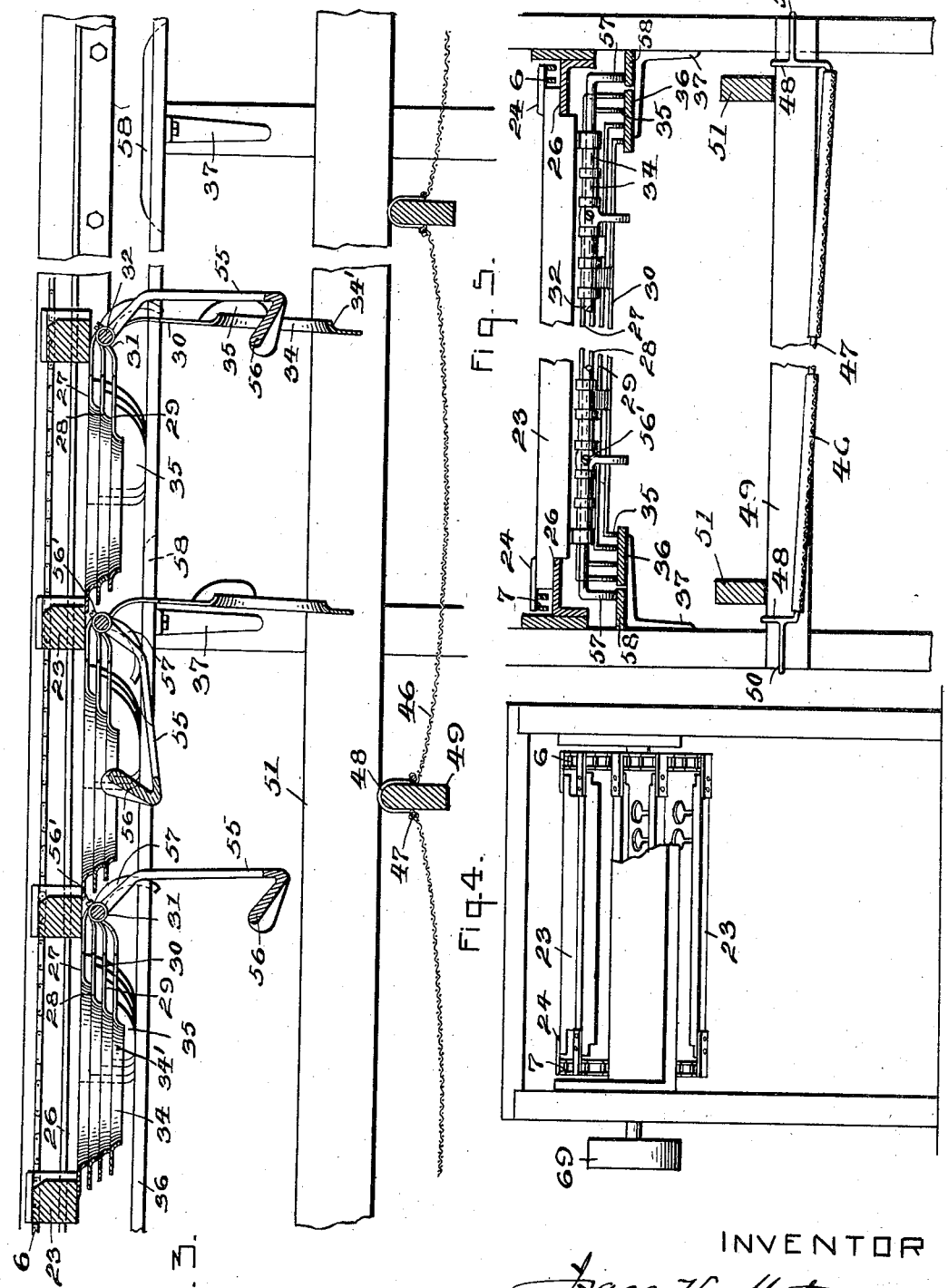

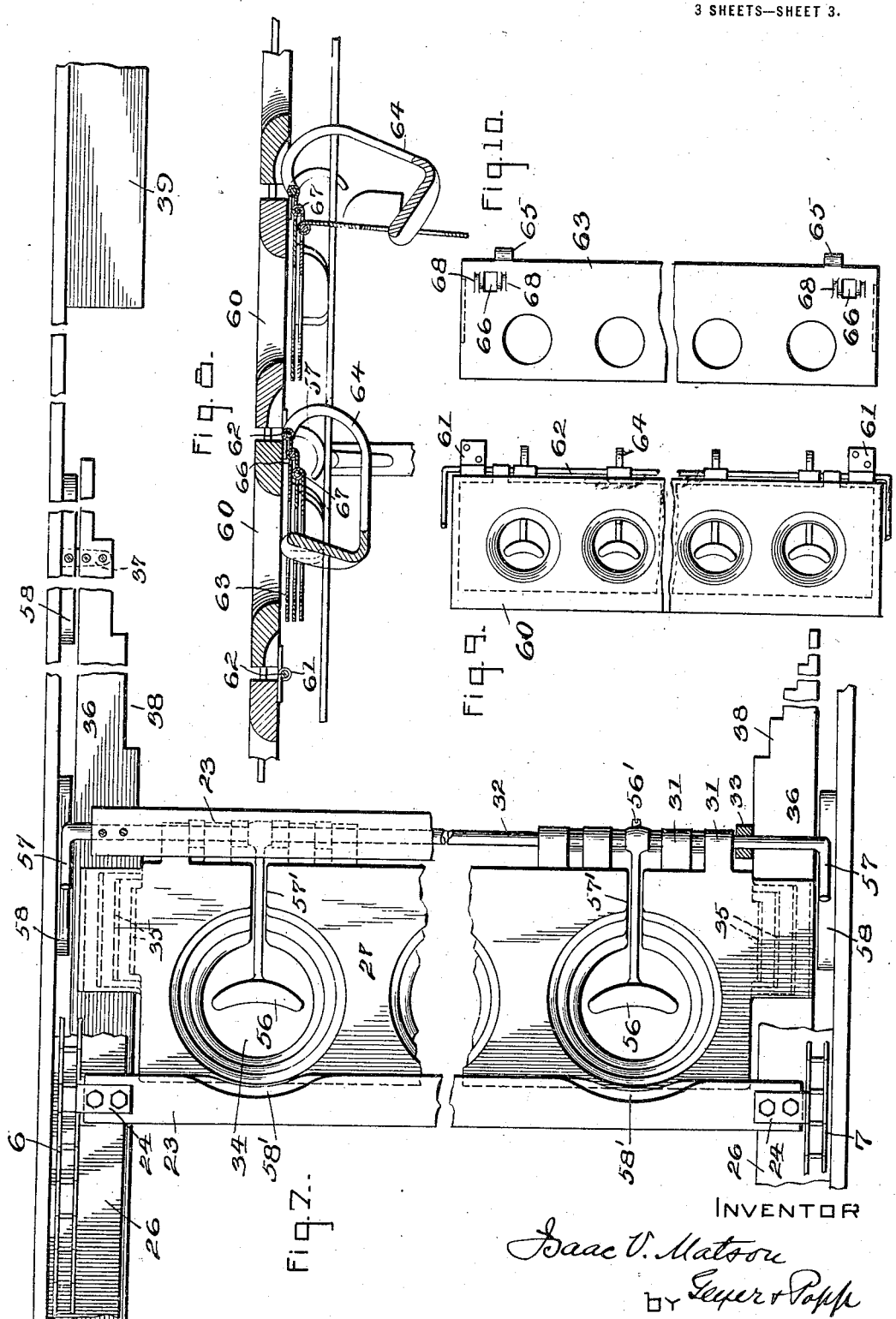

ISAAC V. MATSON, OF WATERPORT, NEW YORK.

GRADING-MACHINE.

1,242,573.

Specification of Letters Patent.

Patented Oct. 9, 1917.

Application filed April 14, 1915. Serial No. 21,242.

*To all whom it may concern:*

Be it known that I, ISAAC V. MATSON, a citizen of the United States, residing at Waterport, in the county of Orleans and State of New York, have invented new and useful Improvements in Grading-Machines, of which the following is a specification.

This invention relates to a grading machine which is more particularly designed for grading or sorting as to size, fruit such as apples, oranges and peaches, although the same may be used for grading other articles.

It is the object of this invention to provide a machine of this character whereby the articles, such as fruit, may be reliably graded with the least amount of handling or bumping, thereby preventing the possibility of bruising or injuring the same.
A further object is to provide a mechanism for preventing injury to the fruit as it passes over the partitions of the different bins.

In the accompanying drawings:
Figure 1 is a top plan view of a grading machine embodying one form of my improvements. Fig. 2 is a vertical longitudinal section of the same taken on line 2—2, Fig. 1. Fig. 3 is a vertical longitudinal section, on an enlarged scale, showing the detail construction of the conveyer buckets. Fig. 4 is a rear view of the machine partly broken away. Fig. 5 is a vertical transverse section, on an enlarged scale, taken on the line 5—5, Fig. 2. Fig. 6 is a fragmentary vertical longitudinal section, on a enlarged scale, of the receiving end of the conveyer. Fig. 7 is a fragmentary top plan view of a portion of the conveyer and track mechanism. Fig. 8 is a fragmentary vertical longitudinal section, on an enlarged scale, showing a modification of one feature of my invention. Fig. 9 is a top plan view, similar to Fig. 7, showing a modified construction of the buckets. Fig. 10 is a top plan view of one of the grading wings used in the modified construction.

Similar characters of reference indicate corresponding parts throughout the several views.

1 represents the main frame of the machine which may be of any suitable construction for supporting the different working parts of the machine. The fruit to be graded is delivered promiscuously as to size upon the front end 2 of the feed box or distributing table 3, where the fruit is spread out smooth and delivered with comparative uniformity to a plurality of longitudinal feed troughs or channels 4 arranged on the front or delivery part of the bottom of the feed box.

As the fruit is discharged from the front ends of the several channels of the feed table in the form of a plurality of streams, each of these streams is delivered upon an endless separator or carrier which moves with its operative upper stretch in the same direction in which the fruit moves over the feed table and is so constructed that it operates to receive the fruit therefrom at intervals and distribute the fruit of like sizes which passes through the carrier at given points and is received in suitable receptacles. Although this separating device may be variously constructed as to detail, the organization of the same which is shown in Figs. 1–7 is constructed as follows:

6, 7 indicate two endless carrying belts which form part of the separator and which pass with their upper operative stretches in front of the delivery end of the feed table. These carrying belts are preferably constructed in the form of sprocket chains and pass at their forward turns around a pair of sprocket wheels 8, 9 which are mounted upon a shaft 10 extending transversely across the front of the machine and journaled in suitable bearings mounted on the frame, while the rear turns of these chains pass around similar sprocket wheels 12, 13 mounted on the transverse shaft 14 extending across the rear of the machine and journaled in suitable bearings mounted on the main frame. 16 and 17 indicate a pair of idle sprocket wheels supporting the upper operative stretches of the carrier belts between the front and rear ends of the same. Additional vertically adjustable idle sprocket wheels 18, 19 are arranged to engage with the underside of the idle lower return stretches of said endless chains. The last mentioned idlers are preferably journaled in vertically adjustable bearings 20, mounted in vertical slots 21 of the brackets 21¹ arranged on the side support of the main frame. Adjustable screws 22 on the lower parts of the brackets 21¹ and engaging with the undersides of the bearings 20 serve as a means for raising or lowering said bearings to tighten or loosen the chain as desired. These carrier belts or chains are connected at intervals by transverse slats or bars 23 secured to said chains by ears 24 projecting laterally therefrom. The arrangement of the rear sprocket wheels 12 and 13 and the intermediate idlers 16 and 17 is such that the upper operative stretch of the endless carrier inclines upwardly from the forward sprockets to the intermediate sprockets, thence horizontally from the intermediate sprockets to the rear sprockets.

26 indicates tracks or guideways which extend horizontally and parallel with the side portions of the frame and upon which the slats or bars 23 are adapted to ride at their opposite ends, thereby preventing any sagging of the carrier on its upper operative stretch.

In moving from the front to the rear, the carrier is constructed so as to deliver therefrom at intervals, fruit of a given size, the smaller first falling through between the slats or bars of the carrier, the next larger then falling between the slats and so on until the largest size which will not pass between the slats is delivered to the final delivery chute 25 which is arranged adjacent to the delivery or rear turn of the separating carrier. The mechanism for increasing the size of the openings between adjacent separating slats of the carrier as it travels toward the rear may be variously constructed as to details, but is preferably constructed as follows:

27, 28, 29 and 30 indicate a plurality of wings or plates which form a set and which are stacked in groups in the space between adjacent slats 23, the number of wings varying as to the number of sizes or grades into which the fruit is to be separated. These wings are pivotally mounted by securing ears 31 on the advancing end thereof to a horizontal shaft 32 arranged transversely on the underside of a slat 23 and journaled in bearings 33 thereon. Each of these wings is provided with a plurality of openings or pockets 34, say seven in number, arranged in transverse alinement across the face of the wings each opening being preferably bordered by a downwardly tapering flange 34¹ so as to form a smooth bearing surface for the fruit. Each wing is provided at its opposite ends with suitable runners or tappets 35 which are bent downwardly therefrom and substantially at right angles thereto and which act to support the wing in a horizontal position. The runners for the lowermost wing are arranged closer together than those of the succeeding runners of the remaining upper wings of the same set, the runners of the next higher wing bridging over the lower wing and extending downwardly therefrom until the lower surfaces or bearing edges thereof are on a level with the bearing edges of the first mentioned runners, and so on for each of the several sets of runners of the remaining wings, all of the runners of each set of wings being preferably in transverse alinement with each other. These runners are in turn supported on suitable tracks 36 mounted on the side portions of the main frame by suitable brackets 37. Each of the tracks at its full width is wide enough to form a support for all of the runners and hold the associating wings in a substantially horizontal position. The tracks, however, diminish in width toward the rear end thereof being cut away as at 38 to allow the wings to drop at intervals from their horizontal position to a substantially vertical position. The corresponding separating or sorting openings of each set or group of wings form nests, the openings of each nest being successively smaller from the uppermost wing to the lowermost wing, so that when a piece of fruit is deposited in a nest and the wings of a set are successively lowered or removed from the underside of the set the bore or diameter of the nest opening will gradually become larger and when the size of the nest opening corresponds to the size of the fruit in the same then the particular pieces of fruit will drop through the nest opening. This successive downward unfolding movement of the wings is controlled by the runners 35 and tracks 36 so that the wings with the smallest openings or pockets drop first and so on until all of the wings have dropped, leaving only the slats to support the remaining fruit which is too large to pass between them. As best shown in Figs. 2 and 7, the track has its full width at 39, as shown in Fig. 7, thereby causing all of the wings to assume their horizontal position before the carrier passes around the rear sprocket wheels. These tracks are interchangeable, different sets having the cut away portions 38 of different widths in order that one or more wings may be dropped simultaneously according to the number of sizes or grades into which the fruit is separated.

Located beneath the upper operative stretch of the carrier are a plurality of bins 40, 41, 42, 43, 44. The first one of these is rectangular in shape and adapted to receive the inferior or small sized fruit, the said bin having an outlet at one side of the machine. Each of the other bins, however, is provided with a canvas bottom 46 which is supported by suitable wire hangers 47, the outer ends of which are preferably bent up vertically from the horizontal portions and are formed into hooks 48 which are adapted to pass over the cross beams 49 of the frame which act as the sides of the bins as well. The vertical portions of the wire hanger are of different heights which act to elevate the canvas bottom at one end thereof, additional hooks 50 extending horizontally from the vertical portions of the wire hanger and adapted to pass around the ends of said supporting beams to prevent displacement of the canvas bottom. These canvas bottoms are interchangeable, the lower end being placed on that side of the main frame from which it is desired to deliver the fruit. The cross beams 49 are in turn suspended from parallel longitudinal bars or beams 51 extending from the rear wall of the first bin 40 to the transverse shaft 14 at the rear of the machine, suitable staples 52 acting to secure the bar to the said shaft.

Mechanism is provided which has the double function of preventing more than a single transverse row of fruit from being fed from the several streams of fruit to the belt at one time, also to retard or prevent any fruit from dropping from the belt or pockets while the latter are passing over the transverse portions of the several bins and also to dislodge any fruit that may become clogged in any of the several pockets. This means may be of any desirable construction, but is preferably organized as follows:—

55 indicates a plurality of agitators or retarders fulcrumed on the horizontal shaft 32, the forward end 56 of each being adapted to swing vertically into one of the several openings 34 of the grading wings 27. These retarders are rigidly secured to the shaft 32 by set screws $56^1$ the outer ends of these shafts being bent at right angles to their transverse horizontal portions and formed into semi-circular runners 57. At intervals elevating blocks or cams 58 are arranged in such a position as to force the forward ends 56 of each agitator up into the pocket of a wing to prevent any fruit from passing through while the wings are passing over any of the several bin partitions. These blocks or cams are of successively increasing height from the front to the rear of the machine, thereby serving to raise the agitator higher each time to compensate for the higher levels of the remaining grading wings as some of them are lowered in their travel toward the rear of the machine. As these agitators are brought into the uppermost position they serve to loosen any fruit that may be wedged in the openings of the wings. Slots $57^1$ arranged transversely of said wings allow free vertical movement of the retarders 56 even though some of said wings may have been lowered to their inoperative position.

As best shown in Fig. 6, these agitators are in their uppermost position as the fruit is received upon the carrier, thereby serving to prevent more than one piece of fruit from being received between adjacent slats from any one stream that is being fed to the carrier. The elevating blocks at this point are semi-circular in shape and serve to retain the retarder in its uppermost position while passing the delivery end of the chute. To further assist in this selection, a plurality of notches $58^1$ are cut into each slat opposite the openings in the grading wings, which serve to influence each piece of fruit to fall into its respective pocket.

As disclosed in Fig. 2, the retarders are down while passing over the first bin, they are however raised while passing over the partition between the first and second bins. Immediately thereafter the retarders and the lowermost wing are dropped, allowing such fruit which is capable of passing through the next larger openings in the wings to be delivered to the second bin, and so on until the last bin has been reached when all of the separating wings and retarders are down allowing all fruit that can pass through the carrier to fall into the last bin, that remaining on the carrier passing to the rear and discharging into the chute 25, thence into a suitable receptacle.

Laterally extending chutes 59 project alternately from opposite sides of the machine to deliver the fruit as it is graded to suitable receptacles.

Instead of making the grading belt of parallel sprocket chains connected by slats which carry the several grading wings, the slats proper may be constructed to serve as the uppermost wings, as shown in the modified construction, Figs. 8, 9 and 10, wherein the slats 60 are wider and pivotally connected together by hinges 61. 62 indicates a shaft passing transversely through the hinges acting also as a support for the second largest grading wing 63 and the agitators or retarders 64. The several grading wings are pivotally connected to one another preferably in the following manner:

Eyelets 65 are arranged at the rear of the wings and adapted to pass through openings 66 in the upper grading wing, pins 67 passing through the eyelets and serving to fulcrum the lower wing to the one above it, the pin being held in place by strips 68 pressed out of the wing with the deflected parts extending above and below the center of the opening, forming a complete eye or ring for the outer end of the pin.

The grader may be operated in any suitable manner, as for instance by means of a belt connecting the source of power with a pulley 69 on the shaft 14 of the rear end of the machine.

My improved grading machine is comparatively simple in construction, it has a large capacity and can be operated with the expenditure of a comparatively small amount of power. Furthermore, the separation of the fruit is effected without injuring the same or impairing its quality.

I claim as my invention:

1. A grading machine comprising an endless separator having a plurality of apertured wings, and transverse slats alternating with said wings, said wings being arranged in sets and the apertures of each set being of gradually decreasing size from one end of the set to the other.

2. A grading machine comprising an endless separator having belts, and apertured wings pivotally mounted on said belts to swing vertically, and means for intermittently raising and lowering said wings.

3. A grading machine comprising an endless separating device composed of endless chains, equally spaced slats arranged transversely of said chains, a plurality of vertically swinging wings each having a plurality of different sized apertures and fulcrumed to the underside of one of said slats, and means for intermittently raising and lowering each of said wings.

4. A grading machine comprising an endless separating device having endless chains, equally spaced slats arranged transversely thereof, a plurality of vertically-swinging wings having apertures therein which normally have their axes arranged vertically, means for supporting said wings on said slats, and a track arranged adjacent to said wings and adapted to control the same, said track having cut away portions for allowing said wings to swing downwardly from said slats.

5. A grading machine comprising an endless separating device having endless chains, equally spaced slats arranged transversely thereof, a plurality of vertically-swinging wings each having different sized apertures therein and fulcrumed to said transverse slats, runners on said wings, and tracks adapted to support said runners, said tracks having cutaway portions for allowing said wings to swing downwardly from said slats.

6. A grading machine comprising an endless separator which is provided with a plurality of grading members having rows of apertures and with rows of agitators, and trip blocks arranged adjacent to said grading members and projecting into the path of said agitators and cause the same to enter said apertures.

7. A grading machine comprising an endless separator having belts, slats arranged transversely thereof, a rock shaft supported on each of said slats and provided with a runner, agitators arranged at intervals on said rock shaft, and trip blocks projecting into the path of said runners so that the latter engage the same and cause the agitators to be moved vertically.

8. A grading machine comprising an endless carrier, and a plurality of separating devices mounted on said carrier and each comprising a plurality of apertured wings, said wings being arranged in sets and wings of each set being adapted to be assembled and separated relatively to one another, and the several apertures of the wings being arranged in groups which are adapted to be alined, and the apertures of each group being progressively smaller from the uppermost to the lowermost one of each group.

9. A grading machine comprising an endless carrier, and a plurality of separating devices mounted on said carrier and each comprising a plurality of apertured wings, said wings being arranged in sets and wings of each set being adapted to be assembled and separated relatively to one another, and the several apertures of the wings being arranged in groups which are adapted to be alined, and the apertures of each group being progressively smaller from the uppermost to the lowermost one of each group, and means movable into and out of the apertures of each group for controlling the passage of articles through the same.

10. A fruit grading machine comprising a rotatable conveyer having an opening therein, a grading valve arranged beneath the opening comprising a series of superposed elements having openings progressively diminishing in size, said elements being pivotally supported to drop by gravity, and means for holding said elements elevated and permitting the same to successively drop at different points in the rotation of the conveyer.

11. A fruit grading machine comprising a rotatable conveyer having an opening therein, a valve arranged beneath said opening and comprising a series of pivotally mounted members arranged in superposed relation and having openings therein progressively diminishing in size, controlling arms connected with said members, and means arranged below the rotatable conveyer for coöperation with said arms to hold the same elevated and permit the members to successively drop at different points in the path of rotation of the conveyer.

12. A fruit grading machine comprising a rotatable conveyer having an opening therein, a valve arranged beneath the opening and comprising a series of superposed, gravity dropping sections, having openings therein varying in size throughout the series, and a stationary support for the valve members disposed below the conveyer and having portions arranged to support the valve sections, successively release and permit the same to drop and to elevate the valve sections for a succeeding operation.

13. A fruit grading machine including a rotatable conveyer having an opening therein, a valve disposed beneath the opening in the conveyer and comprising a series of superposed, pivotally mounted, gravity dropping elements provided with openings therein progressively diminishing in size, said elements having controlling arms, and a stationary plate disposed below the conveyer and having a portion to engage the arms and hold all the valve members elevated, cut away portions to successively release the arms to permit the valve members to drop, and a portion for elevating the arms and returning the valve members to normal position.

ISAAC V. MATSON.

Copies of this patent may be obtained for five cents each, by addressing the "Commissioner of Patents, Washington, D. C."